United States Patent
Bonardi et al.

(10) Patent No.: US 6,340,729 B1
(45) Date of Patent: Jan. 22, 2002

(54) PROCESS OF POLYMERIZING VINYL CHLORIDE WITH HYDROXYLAMINES

(75) Inventors: Christian Bonardi, Saint-Genis Laval; Pierre Hebrard, Lyons; Richard Peres, Saint-Auban sur Durance, all of (FR); Kenneth Malone, Philadelphia, PA (US); Martin Nosowitz, Berwyn, PA (US); Michael Mendolia, Philadelphia, PA (US); Peter Callais; Barbara Stainbrook, both of Collegeville, PA (US); Jianfeng Lou, Wayne, PA (US)

(73) Assignees: Atofina Chemicals, Inc., Phila., PA (US); Atofina (FR)

( * ) Notice: Subject to any disclaimer, the term of this patent is extended or adjusted under 35 U.S.C. 154(b) by 0 days.

(21) Appl. No.: 09/902,956

(22) Filed: Jul. 11, 2001

Related U.S. Application Data

(60) Provisional application No. 60/220,752, filed on Jul. 26, 2000.

(51) Int. Cl.$^7$ ............................... C08F 2/42; C08F 2/38

(52) U.S. Cl. .......................................... 526/83; 526/211
(58) Field of Search ............................. 526/83, 211, 220

(56) References Cited

U.S. PATENT DOCUMENTS

| | | | | |
|---|---|---|---|---|
| 3,222,334 A | * | 12/1965 | Demme | |
| 3,951,925 A | * | 4/1976 | Mishima | 526/72 |
| 4,749,757 A | * | 6/1988 | Schram | 526/83 |
| 5,384,372 A | * | 1/1995 | Lattime | 526/83 |

* cited by examiner

*Primary Examiner*—Christopher Henderson
(74) *Attorney, Agent, or Firm*—Gilbert W. Rudman; Stanley A. Marcus

(57) ABSTRACT

In the process according to the invention for the aqueous suspension polymerization of vinyl chloride, alone or as a mixture with another vinyl monomer, the polymerization initiator comprises at least one compound chosen from dialkyl peroxydicarbonates, peroxy-tert-alkanoates and diacyl peroxides and use is made, as agent for halting the polymerization, of a mono- or disubstituted hydroxylamine. The resins thus obtained exhibit improved color and heat stability.

13 Claims, No Drawings

PROCESS OF POLYMERIZING VINYL CHLORIDE WITH HYDROXYLAMINES

REFERENCE TO RELATED APPLICATIONS

This application claims the benefit of U.S. Provisional application Serial No. 60/220,752 filed Jul. 26, 2000 and French Application 00.13497 filed Oct. 20, 2000.

BACKGROUND OF THE INVENTION

1. Field of the Invention

This invention relates to an aqueous suspension polymerization process for producing polymeric, esp.,polyvinyl chloride and PVDF, products with improved color, the process utilizing combinations of an N substituted hydroxylamine shortstopper with certain polymerization initiators.

2. Description of the Prior Art

In the manufacture of polyvinyl chloride, it is important commercially to obtain the best yield and quality at the lowest cost. Both initiator and shortstop can be significant factors. Ideally, PVC should be produced with effective, cheap, non-toxic, non-yellowing shortstopper and initiator.

Di 2-ethylhexylperoxydicarbonate and di(sec-butyl) peroxydicarbonate (marketed and designated as Lup 223 and Lup 225 respectively) are inexpensive initiators which work well but produce PVC with poor color.

The most commonly used short-stoppers for the aqueous suspension polymerization of vinyl chloride are ATSC (acetone thiosemicarbazone), bisphenol A (4,4'-isopropylidenediphenol) and Irganox® 245 (2,4-dimethyl-6-sec-hexadecylphenol), alone or as a mixture with Irganox® 1076 [octadecyl 3-(3,5-di-tert-butyl-4-hydroxyphenyl)propionate]. Irganox® 1141 (hereinafter IGX 1141) is a commercial mixture of 80 parts by weight of Irganox® 245 and of 20 parts by weight of Irganox® 1076. However, these short-stoppers all have some drawback: poor water solubility, slow to stop polymerization, toxicity/handling issues.

N,N-diethylhydroxylamine (DEHA), a representative substituted hydroxylamine compound, has been used in PVC production as a vinyl chloride stabilizer, as a "killer" to stop runaway reactions, as an antiscalant, and when added prior to initiation at low levels, to modify PVC density (sometimes referred to as "stunning" the initiator) or to prevent unwanted polymerization during the "warm-up" period.

Hydroxylamine compounds are also known in the industry as PVC shortstoppers; however, most tests indicated that DEHA caused yellowing of the polymer.

U.S. Pat. No. 3,222,334, (Dec. 7, 1965) discloses in the specification that N,N-dialkylhydroxylamines may be used to stop emulsion polymerization of vinyl chloride. However, no examples are given, and no advantage is noted. The reference suggested that dialkylhydroxylamines have a "non-toxic and non-discoloring nature", but this is in reference to use with various rubbers, and the distinction may be drawn between non-discoloring and stabilization of color; the former suggests non-involvement in color formation whereas the latter implies an interference in color-producing processes.

World Patent Application WO 98/51714 discloses the use of ethylhydroxylamine as a shortstopping agent for free radical polymerization. However, novelty is claimed through the allegedly "surprising non-volatility" of ethylhydroxylamine, as well as its low corrosivity and water solubility. However this patent, while claiming use for all free radical polymerizations, discusses only emulsion polymerization of rubbers, and all the examples address comparisons related to such processes.

U.S. Pat. No. 4,749,757 includes the use of DEHA (and other polymerization inhibitors)in conjunction with PVA (a suspension agent)to simultaneously increase the density and porosity of PVC by maintaining a low concentration (5–10 ppm preferred)in the reactor. However, DEHA is not disclosed as a shortstopper for PVC.

In JP 02235912, Kanolo et al describe a "reaction product of DEHA, cyclopentadiene, and pyrogallol" which when applied to reactor walls prevents the formation of scale. This relates to a known application which exploits the properties of hydroxylamines as part of a coating to impart antiscaling properties to the walls of PVC reactors.

It is also known in the art to use DEHA as a "kill" agent, to halt runaway vinyl chloride polymerization. Due to DEHA's excellent solubility and thus rapid dispersability in water, it is effective in halting vinyl chloride polymerization when, for example, an electrical failure occurs and mechanical stirring ceases.

SUMMARY OF INVENTION

In the present invention, it has been discovered that combinations of substituted hydroxylamine shortstopper with certain organic initiators provide excellent polymerization kinetics and a rapid, efficient shortstopping, resulting in high yields of high-quality polymer at low cost.

When vinyl chloride resin derived from the described process is compounded, the thermal stability and color of the product is sometimes found to be improved over resin which has been made with no shortstopper.

Another aspect of this invention relates to improving the color of extruded PVC by adding a substituted hydroxylamine to the heat stabilizer.

Another aspect of the invention relates to the process which provides excellent polymerization kinetics and a rapid, efficient shortstopping, resulting in high yields of high-quality polymer at low cost by the use of combinations of alkyl substituted hydroxylamine shortstopper with dialkyl peroxydicarbonates, peroxy-tert-alkanoates and diacyl peroxides initiators.

In another aspect of the invention for the aqueous suspension polymerization of vinyl chloride, alone or as a mixture with another vinyl monomer, the polymerization initiator comprises at least one compound chosen from dialkyl peroxydicarbonates, peroxy-tert-alkanoates and diacyl peroxides and use is made, as agent for halting the polymerization, of a mono- or dialkylhydroxylamine, each alkyl radical of which comprises from 1 to 4 carbon atoms. The resins thus obtained exhibit excellent whiteness.

A final aspect of the invention relates to improved uptake of plasticizer which occurs when shortstopping is effected with mono- or dialkylhydroxylamines.

DETAILED DESCRIPTION OF THE INVENTION

It has now been found that the combination of an initiating system comprising at least one compound chosen from dialkyl peroxydicarbonates, peroxy-tert-alkanoates and diacyl peroxides and of a polymerization short-stopper composed of a mono- or di-alkyl N substituted hydroxylamine makes it possible not only to efficiently halt the polymerization but also to obtain, at the same time, a PVC or copolymer resin resulting in materials exhibiting excellent whiteness. Furthermore, in comparison with conventional short-stoppers, mono- and dialkyl substituted hydroxylamines exhibit the advantage of being instantaneously dilutable in water at the working concentrations without the addition of stabilizer or of solvent.

A subject-matter of the invention is thus a process for the aqueous suspension polymerization of vinyl chloride, alone or as a mixture with less than 50% of another vinyl monomer, characterized in that the polymerization initiator comprises at least one compound chosen from dialkyl peroxydicarbonates, peroxy-tert-alkanoates and diacyl peroxides and in that the polymerization short-stopper is a mono- or dialkyl N substituted hydroxylamine, each alkyl radical of which comprises from 1 to 4 carbon atoms.

The oil-soluble initiating system generally used is composed of one or more radical-generating compounds which trigger the polymerization of the monomer component. These radicals generally result from the thermal decomposition of diacyl peroxides, of dialkyl peroxydicarbonates or of peroxy-tert-alkanoates. It is industrial practice to express the amount of initiator(s) introduced into the reaction mixture by the overall content of active oxygen capable of being released by the initiating system. The total amounts of active oxygen generally used are between 0.0005 and 0.01 parts by weight, preferably between 0.0015 and 0.005 parts by weight, per 100 parts by weight of monomer component. When use is made of a mixture of initiators having different half lives for a given temperature, the proportion of one with respect to the other can range from 1 to 99% by weight, preferably from 10 to 90%. At an identical temperature, the more initiator introduced into the reaction medium, the faster the reaction. At an identical polymerization duration, the higher the polymerization temperature, the less initiator remains in the reaction medium.

In an aqueous suspension polymerization process carried out batchwise industrially, it is generally desirable to halt the polymerization after having reached a predetermined degree of conversion, so as to obtain a stable and uniform polymer. It can also sometimes prove to be necessary to halt or slow down the reaction in the final polymerization phase, that is to say when the conversion has reached values of greater than 60% by mass, in order to avoid final exotherms which are difficult to control by simple heat exchange with the walls (jacket or condenser).

In dialkyl peroxydicarbonates, each alkyl radical can comprise from 1 to 16 carbon atoms and can be linear, branched or cyclic. Mention may be made, as non-limiting examples of such dialkyl peroxydicarbonates, of diethyl, diisopropyl, di-n-propyl, dibutyl, dicetyl, dimyristyl, di(4-tert-butylcyclohexyl) or di(2-ethylhexyl) peroxydicarbonates. Preference is given to peroxydicarbonates in which each alkyl radical comprises from 6 to 16 carbon atoms and more particularly to di(2-ethylhexyl) peroxydicarbonate.

The dialkyl peroxydicarbonates used according to the invention are classified in the family of rapid initiators. They generally have a half-life of 1 hour at approximately 56–67° C. and can thus be used for vinyl chloride polymerization temperatures of between 50 and 70° C.

Mention may be made, as non-limiting examples of very rapid initiators from the family of the peroxy-tert-alkanoates, of 1,1-dimethyl-3-hydroxybutyl peroxyneodecanoate, cumyl peroxyneodecanoate, 1,1,3,3-tetramethylbutyl peroxyneodecanoate and 1,3-di(2-neodecanoylperoxyisopropyl)benzene. The very rapid peroxy-tert-alkanoates generally have a half-life of 1 hour at approximately 53–61° C.

The hydroxylamines, including N substituted compounds, useful in this invention include but are not limited to the structures:

wherein $R^1$ and $R^2$ may be the same or different, and are selected from: H, $C_1$–$C_{14}$ hydrocarbons, where each chain may be branched, unsaturated, or have hydrogen substituted with functional groups such as —OH, —SO, benzyl, amino, —SH, keto, carboxyl, and other such functional groups. Two of the R may also be part of a cyclic structure, such as in piperidinyloxy compounds. Mixtures of any of these with others from this list or with other known PVC shortstoppers such as bisphenol A may also be used to advantage.

The substituted hydroxylamine used according to the invention as polymerization short-stopper is introduced at between 60 and 90% of conversion by mass, preferably between 70 and 80%, that is to say when the fall in pressure has already begun. The amount of mono- or dialkylhydroxylamine to be used can range from 0.0005 to 0.1 parts by weight and is preferably between 0.001 and 0.05 parts by weight per 100 parts by weight of monomer component.

The polymerization short-stopper according to the invention is preferably chosen from dialkylhydroxylamines, the more particular preferred dialkylhydroxylamine being N,N-diethylhydroxylamine, due to its water solubility, high efficiency, and commercial availability.

The polymers which may be made by the process of this invention include but are not limited to polyvinyl chloride, polyvinylidene fluoride, polyvinylfluoride, and PTFE.

The term "aqueous suspension polymerization" is understood to mean a polymerization carried out in the presence of at least one oil-soluble initiator, the monomer component (vinyl chloride, alone or as a mixture with another vinyl monomer) being dispersed by mechanical means in an aqueous medium comprising at least one suspending agent.

The proportion of vinyl chloride in the monomer component is at least 50% by weight, preferably greater than 80%. The vinyl monomers which can be copolymerized in aqueous suspension with vinyl chloride are well known and mention may be made, as non-limiting examples, of vinyl esters, such as vinyl acetate, vinylidene halides, such as vinylidene chloride and vinylidene fluoride, acrylic esters, such as butyl acrylate, and methacrylic esters, such as methyl methacrylate.

The suspending agents generally used in suspension polymerization are known protective colloids, for example water-soluble polymers, such as polyvinyl alcohols, polyethylene oxides, water-soluble cellulose derivatives, such as methylcellulose, polyvinylpyrrolidone, gelatin and vinyl acetate/maleic anhydride copolymers. These suspending agents can be used alone or in the form of mixtures in amounts generally of between 0.01 and 0.5 parts by weight, preferably between 0.04 and 0.2 parts by weight, per 100 parts by weight of monomer component.

A system for buffering the pH of the aqueous medium is generally used. This system, which is, for example, citric acid for an acidic pH and sodium hydrogencarbonate for a basic pH, is employed in an amount of between 0.01 and 0.2 parts by weight, preferably between 0.02 and 0.1 parts by weight, per 100 parts by weight of monomer component.

The aqueous suspension polymerizations of vinyl chloride or of a monomer component based on vinyl chloride are generally carried out between 45 and 80° C., preferably between 50 and 70° C., which makes possible a very wide use of initiators from the family of the dialkyl peroxydicarbonates.

However, when the chosen polymerization temperature is not very high (between 50 and 57° C.), it may prove useful to employ a combination of initiators having different half-lives at the chosen temperatures, for example comprising a dialkyl peroxydicarbonate and an initiator from the family of the very rapid peroxy-tert-alkanoates, or a combination of initiators from the family of the peroxy-tert-alkanoates comprising a rapid peroxy-tert-alkanoate and a very rapid peroxy-tert-alkanoate.

When the chosen polymerization temperature is slightly higher (between 56 and 63° C.), it may prove useful to employ a combination of initiators having different half-lives at the chosen temperatures, for example comprising a dialkyl peroxydicarbonate and an initiator from the family of the rapid peroxy-tert-dialkanoates, or a combination of rapid peroxy-tert-alkanoates.

The rapid peroxy-tert-alkanoates generally have a half-life of 1 hour between 61 and 70° C. and can thus be used for vinyl chloride polymerization temperatures of between 50 and 70° C. Mention may be made, as non-limiting examples of rapid peroxy-tert-alkanoates, of tert-butyl peroxyneodecanoate and tert-amyl peroxyneodecanoate.

In the case of a fairly high polymerization temperature (between 62 and 70° C.), it may prove useful to employ a combination of initiators having different half-lives at the chosen temperatures, for example comprising a dialkyl peroxydicarbonate or a rapid peroxy-tert-alkanoate and a rather slow initiator from the family of the diacyl peroxides, such as dilauroyl peroxide.

The process according to the invention can be carried out in a way known per se consisting, for example, in dissolving a protective colloid in an aqueous medium or a monomer component, in dispersing the oil-soluble polymerization initiator in the aqueous medium or in dissolving it in the monomer component, and in dissolving a system for buffering the pH of the aqueous medium. The traces of oxygen are removed, so as to have a residual content of oxygen dissolved in the water of between 0.0005 and 0.05 parts by weight, preferably between 0.001 and 0.02 parts by weight, per 100 parts by weight of water. The monomer component is subsequently introduced into the reactor and then the reaction mixture is stirred and brought to a temperature of between 45 and 80° C., preferably between 50 and 70° C.

It is not necessary, during the polymerization, to keep the pressure and the temperature of the reaction mixture constant. A programmed temperature increase, either at the beginning or at the end of the polymerization cycle, makes it possible to accelerate the rate of decomposition of the initiators and the polymerization rate. If this temperature and this pressure are kept constant, the polydispersity of the molecular masses of the polymer chains will be between 1.8 and 2.5. In the case of a polymerization with programmed temperature gradients throughout the duration of the polymerization, a polydispersity of between 1.8 and 3.5 will be observed.

The polymerization is brought to an end by depletion of the liquid monomer phase and this is reflected by a modification in the monomer liquid/vapour equilibrium and a fall in pressure is observed. At the beginning of the fall in pressure, the conversion by mass of monomer is in the region of 65–75%.

Once the polymerization is complete, the polymer formed is separated from the aqueous medium and then it is drained and dried. It generally exists in the form of particles with a particle size of the order of 80 to 250 micrometers.

In a preferred embodiment of the present invention, vinyl chloride is polymerized in a suspension such as is well known to those skilled in the art, using an amount of peroxydicarbonate initiator (or mixture of initiators including peroxydicarbonate and a "fast" perester) optimal to the conditions and reactor, and the suspension is shortstopped by a calculated amount of alkylhydroxylamine, based on an empirical relationship, during pressure drop.

In a more preferred embodiment the peroxide is di-2-ethylhexylperoxydicarbonate, and the alkylhydroxylamine is N,N-diethylhydroxylamine (DEHA).

In the present invention we have found that both DEHA and dibutylhydroxylamine react with di 2-ethylhexylperoxydicarbonate to accelerate its destruction. Further, when DEHA is used as a shortstopper for suspension PVC, the whiteness of that PVC is sometimes improved as compared with PVC made without shortstopping. It was also found that an excess of DEHA added as shortstop will result in an increase in yellowness of the polymer. This may be due to the nucleophilic nature of the hydroxylamine. Thus the quality of the polymer is dependent on using sufficient hydroxylamine to effect both complete shortstopping and complete removal of residual initiator with no excess to cause discoloration. The correct amount will depend on conditions of polymerization, amount of peroxide initiator used, and the nature of the peroxide.

Another aspect of this invention is the use of substituted hydroxylamines to improve the color of extruded PVC when added as a synergist to the heat stabilizer. In a series of experiments, DEHA was made a component of the compounding formulation added to PVC resin prior to extrusion. The proportion of DEHA was varied from 0 to 60 ppm resin, and the results indicated a synergistic reduction of color when DEHA is present below 60 ppm, especially about 35 ppm. When more than 60 ppm DEHA was added, an antagonism was observed. The preferred range is 20–50 PPM.

In the method of the present invention, the substituted hydroxylamine is used as a shortstopper at the end of the reaction, and higher uptake of plasticizer is achieved by that use.

The following examples are illustrative of the invention but are not intended to be exhaustive or to limit the invention to the precise form disclosed. Many other variations and modifications are possible in light of the specification and examples. The parts and percentages shown are expressed by weight, unless otherwise mentioned.

EXAMPLE 1 (control)

14 kg of demineralized water, 2.52 g of citric acid, 3.73 g of polyvinyl alcohol having a degree of hydrolysis of 78 molar %, 3.73 g of polyvinyl alcohol having a degree of hydrolysis of 72 molar %, 8.08 g of an aqueous solution (comprising 39% of active material) of polyvinyl alcohol having a degree of hyrolysis of 55 molar % and 13.63 g of a di(2-ethylhexyl) peroxydicarbonate emulsion comprising 40% of active material (Luperox® 223 EN40) are introduced, at ambient temperature and with stirring (250 r/min), into a reactor with a capacity of 30 liters which is equipped with a stirrer of impeller type comprising three arms and with a jacket. The content of active oxygen is then 28 ppm with respect to the weight of the vinyl chloride monomer (VCM) which will subsequently be charged.

After having closed the reactor, it is placed under partial vacuum (6.66 kPa absolute), which vacuum is maintained for 15 minutes. The stirring is subsequently brought to 330 r/min and 9 kg of VCM are then introduced.

The heating is regulated by circulation of cold water in the jacket to reach, in 30 minutes, the polymerization temperature of 56.50° C. The moment when the polymerization medium reaches 56.50° C. is regarded as the beginning of the polymerization (time=$t_0$) and the pressure at this instant (P) is then taken as reference.

After polymerizing for 30 minutes (i.e. at time $t_0$+30 min), 4 kg of water are introduced continuously into the reactor with a constant flow rate of 1.2 kg/h to improve the heat exchange while keeping constant the exchange surface area of the jacket and to decrease the viscosity of the aqueous suspension after 60% of conversion of the VCM to PVC, which conversion is calculated by a heat balance determined at the limits of the reactor.

The depletion of the VCM gas phase in the reactor is reflected by a fall in pressure between 65 and 70% conversion. As soon as the pressure has fallen by 1 bar with respect to $P_0$, the polymerization is halted by rapid cooling of the medium by means of cold water injected into the jacket.

The residual content of di(2-ethylhexyl) peroxydicarbonate is approximately 90 ppm by weight with respect to the initial weight of monomer.

The residual VCM is subsequently removed from the reaction medium by conventional techniques of returning to atmospheric pressure (degassing) and the traces of VCM are subsequently removed by degassing under a vacuum of 13.33 kPa at 50° C. (stripping).

The PVC resin thus obtained (K value=67) is then drained, dried for 6 hours on a fluidized bed with a stream of dry air heated at 50° C. and sieved through a 500 μm mesh.

The coloration index of this resin on a pressed plate or WIPP (White Index Pressed Plate) is evaluated as follows:

150 g of resin are blended in a 600 ml Brabender mixer for 5 minutes at 50 r/min and at 96° C. with 12 g of a solution of 1 part of dioctyl phthalate in 17 parts of MOK (thermal stabilization solution based on tin in the liquid form sold by Ciba). The blend is removed from the mixer and, by means of a Weber pressing device and at the latest in the following 15 minutes, 20 g of the blend are pressed for 2 minutes at 184° C. and under 300 bar in a mould with a diameter of 70 mm and a thickness of 3 mm between two aluminum sheets with a thickness of 0.05 mm. The plate obtained is subsequently cooled in water for 45 seconds and then, in the period from 30 to 90 minutes after the pressing, its coloration is measured by means of the Hunterlab D 25 M DP 9000 device and expressed according to the ASTM standard E 313 in WIPP by the formula:

$$WIPP=(L/100)(L-5.71b)$$

the values L and b being given by the device.

EXAMPLE 2

The polymerization was carried out as in Example 1 except that, as soon as the fall in pressure reached 0.3 bar (that is to say, at $P_0$−0.3 bar), a 1.35% aqueous diethylhydroxylamine (DEHA) solution was injected into the reaction medium over 2 minutes in a proportion of 100, 150, 175, 200 and 300 ppm by weight of DEHA respectively with respect to the initial weight of VCM and the reaction medium was maintained at 56.50° C. for 15 minutes before being cooled. The degassing, the stripping, the draining, the drying and the sieving were subsequently carried out in the same way as in Example 1 and the PVC resins thus obtained were evaluated in WIPP according to the same test.

TABLE 1

Initiator - di-2-ethylhexylperoxydicarbonate

| Initial charge (ppm) | Polymn. Time (Min) | DEHA shortstopper used (ppm) | ΔP/Δt (mbar/min) | WIPP |
|---|---|---|---|---|
| 600 | 230 | 0 | 41 | 35 |
| 600 | 230 | 100 | 20 | 38 |
| 600 | 215 | 150 | 17 | 49 |
| 600 | 220 | 175 | 1 | 39 |
| 600 | 205 | 200 | 0 | 44 |
| 600 | 205 | 300 | 0 | 42 |

The results indicate that the PVC color as measured by WIPP is improved by the use of DEHA as shortstopper, and that the improvement is dependent on the amount of DEHA used. Excess DEHA does not benefit and in fact may reverse the color improvement.

EXAMPLES 3 to 8 (comparative)

Example 2 was repeated but replacing the aqueous DEHA solution with a solution of various compounds known as shortstoppers, namely bisphenol A (BPA) used in the form of a 35% methanolic solution, in a proportion of 370 ppm by weight of BPA with respect to the initial weight of VCM (Example 3), Irganox® 1141 (IGX 1141), which is provided in the form of an 8% solution in an epoxidized soybean oil, in a proportion of 620 ppm by weight of IGX 1141 with respect to the initial weight of VCM (Example 4).

butyl hydroxy anisol (BHA) used in the form of a 3% methanolic solution, in a proportion of 76 ppm by weight of BHA with respect to the initial weight of VCM (Example 5).

Alpha-methylstyrene(alphaMS) used in the form of a 2% methanolic solution, in a proportion of 196 ppm by weight alphaMSA with respect to the initial weight of VCM (Example 6).

Sodium nitrite used in the form of a 1% aqueous solution, in a proportion of 116 ppm by weight $NaNO_2$ with respect to the initial weight of VCM (Example 7).

Ammonium salt of N-nitrosophenyl-hydroxylamine (Cupferon) used in the form of a 2.5% aqueous solution, in a proportion of 65 ppm by weight Cuferon with respect to the initial weight of VCM (Example 8). Comparative examples 3 to 8 and their results are summarized in the following table.

| | Short-stopper | | ΔP/Δt | |
|---|---|---|---|---|
| Example | nature | Amount by weight | Amount molar | (mbar/min) | WIPP |
| 3 | BPA | 370 ppm | 15 mmole | 0 | 46 |
| 4 | IGX 1141 | 620 ppm | 15 mmole | 3 | 47 |
| 5 | BHA | 76 ppm | 4 mmole | 0 | 48 |
| 6 | alphaMS | 198 ppm | 15 mmole | 0 | 33 |
| 7 | NaNO2 | 116 ppm | 15 mmole | 0 | opaque |
| 8 | Cupferon | 65 ppm | 4 mmole | 0 | opaque |

BPA (example 3), IGX 1141 (Example 4) and BHA (Example 5) result in resins with a white index near to that of Example 2 with 150 ppm of DEHA. However, these shortstoppers have the inconvenience of not being sufficiently water-soluble and therefore need to be used in methanolic solution, AlphaMS (example 6) presents the same inconvenience and furthermore leads to a poor white index.

Sodium nitrite and Cupferon (Examples 7 and 8) are sufficiently water-soluble, but lead to opaque resins.

EXAMPLE 9 (control)

The polymerization was carried out as in Example 1 but replacing half (300 ppm) of the di(2-ethylhexyl) peroxydicarbonate with 350 ppm of 1,1-dimethyl-3-hydroxybutyl peroxyneodecanoate in the form of a 50% by mass solution in isododecane.

The duration of polymerization is identical to that in Example 1. The residual contents of 1,1-dimethyl-3-hydroxybutyl peroxyneodecanoate and of di(2-ethylhexyl) peroxydicarbonate are 7 ppm and 43 ppm respectively.

EXAMPLE 10

The polymerization was carried out as in Example 9 except that, as soon as the fall in pressure reached 0.3 bar (i.e. at $P_0$–0.3 bar), a 1.35% aqueous diethylhydroxylamine (DEHA) solution was injected into the reaction medium over 2 minutes in a proportion of 50 ppm of DEHA with respect to the initial weight of VCM and the reaction medium was maintained at 56.5° C. for 15 minutes before being cooled. The degassing, the stripping, the draining, the drying, the sieving and the measuring of the WIPP were subsequently carried out in the same way as in Example 1.

Examples 9 and 10 and their results are summarized in the following table.

| Example | DEHA added | $\Delta P/\Delta t$ (mbar/min) | WIPP |
|---|---|---|---|
| 9 | none | 34 | 45 |
| 10 | 50 ppm | 25 | 49 |

An effect of the DEHA as polymerization regulating agent is observed with only 50 ppm. The white index of the resin is improved.

EXAMPLE 11 (control)

The polymerization was carried out as in Example 1 but replacing the 600 ppm of di(2-ethylhexyl) peroxydicarbonate with 600 ppm of tert-butyl peroxyneodecanoate in the form of a 50% by mass solution in isododecane.

The duration of polymerization is similar to that in Example 1. The residual content of tert-butyl peroxyneodecanoate is approximately 180 ppm.

EXAMPLE 12

The polymerization was carried out as in Example 11 except that, as soon as the fall in pressure reached 0.3 bar (i.e. at $P_0$–0.3 bar), a 1.35% aqueous diethylhydroxylamine (DEHA) solution was injected into the reaction medium over 2 minutes in a proportion of 50 ppm of DEHA with respect to the initial weight of VCM and the reaction medium was maintained at 56.50° C. for 15 minutes before being cooled. The degassing, the stripping, the straining, the drying, the sieving and the measuring of the WIPP were subsequently carried out in the same way as in Example 1.

Examples 11 and 12 and their results are summarized in the following table.

| Example | DEHA added | $\Delta P/\Delta t$ (mbar/min) | WIPP |
|---|---|---|---|
| 11 | none | 35 | 50 |
| 12 | 50 ppm | 25 | 50 |

An effect of the DEHA as polymerization regulating agent is observed with only 50 ppm. The white index of the resin is maintained.

EXAMPLE 13 (control)

The polymerization was carried out as in Example 11 but replacing half (300 ppm) of the tert-butyl peroxyneodecanoate with 350 ppm of 1,1-dimethyl-3-hydroxybutyl peroxyneodecanoate in the form of a 50% by mass solution in isododecane.

The duration of polymerization is identical to that in Example 11. The residual contents of 1,1-dimethyl-3-hydroxybutyl peroxyneodecanoate and of tert-butyl peroxyneodecanoate are approximately 7 ppm and 90 ppm respectively.

EXAMPLE 14

The polymerization was carried out as in Example 13 except that, as soon as the fall in pressure reached 0.3 bar (i.e. at $P_0$–0.3 bar), a 1.35% aqueous diethylhydroxylamine (DEHA) solution was injected into the reaction medium over 2 minutes in a proportion of 50 ppm of DEHA with respect to the initial weight of VCM and the reaction medium was maintained at 56.5° C. for 15 minutes before being cooled. The degassing, the stripping, the draining, the drying, the sieving and the measuring of the WIPP were subsequently carried out in the same way as in Example 1.

Examples 13 and 14 and their results are summarized in the following table.

| Example | DEHA added | $\Delta P/\Delta t$ (mbar/min) | WIPP |
|---|---|---|---|
| 13 | none | 23 | 48 |
| 14 | 50 ppm | 18 | 48 |

An effect of the DEHA as polymerization regulating agent is observed with only 50 ppm. The white index of the resin is maintained.

What is claimed is:

1. Process for the aqueous suspension polymerization of vinyl chloride, alone or as a mixture with less than 50% of another vinyl monomer, characterized in that the polymerization initiator comprises at least one compound chosen from dialkyl peroxydicarbonates, peroxy-tert-alkanoates and diacyl peroxides and in that use is made, as polymerization regulating agent or short-stopper, of a mono- or di alkyl substituted N hydroxylamine, each alkyl radical of which comprises from 1 to 4 carbon atoms in the amount of 0.0005 to 0.1 parts by weight per 100 parts by weight of monomers.

2. The process of claim 1 in which the polymerization regulating agent or short-stopper is a dialkylhydroxylamine, wherein each alkyl radical comprises from 1 to 4 carbon atoms.

3. The process of claim 2 wherein the short-stopper is diethylhydroxylamine.

4. The process of claim 1 in which each alkyl radical of the dialkyl peroxydicarbonate comprises from 1 to 16 carbon atoms.

5. The process of claim 4 wherein the alkyl radical has 8 carbon atoms.

6. The process of claim 4 in which the polymerization initiator is di(2-ethylhexyl) peroxydicarbonate.

7. The process of claim 1 in which the polymerization initiator comprises a dialkyl peroxydicarbonate and a very rapid peroxy-tert-alkanoate.

8. The process of claim 7 in which the very rapid peroxy-tert-alkanoate is 1,1-dimethyl-3-hydroxybutyl peroxyneodecanoate.

9. The process of claim 1 in which the polymerization initiator comprises a dialkyl peroxydicarbonate and a rapid peroxy-tert-alkanoate.

10. The process of claim 1 in which the polymerization initiator is a mixture of a dialkyl peroxydicarbonate or of a peroxy-tert-alkanoate with a diacyl peroxide.

11. The process according to claim 10 in which the peroxy-tert-alkanoate is 1,1-dimethyl-3-hydroxybutyl peroxyneodecanoate.

12. The process according to claim 1 in which the polymerization initiator is a mixture of two rapid peroxy-tert-alkanoates or a mixture of a very rapid peroxy-tert-alkanoate and of a rapid peroxy-tert-alkanoate.

13. The process according to claim 12 in which the very rapid peroxy-tert-alkanoate is 1,1-dimethyl-3-hydroxybutyl peroxyneodecanoate.

* * * * *